(12) United States Patent
Chicurel Uziel et al.

(10) Patent No.: US 8,979,698 B2
(45) Date of Patent: Mar. 17, 2015

(54) CYCLOIDAL TRANSMISSIONS

(71) Applicant: Universidad Nacional Autonoma de Mexico, Distrito Federal (MX)

(72) Inventors: Ricardo Chicurel Uziel, Distrito Federal (MX); Luis Alberto Vazquez Perez, Distrito Federal (MX); Gabriel Ascanio Gasca, Distrito Federal (MX)

(73) Assignee: Universidad Nacional Autonoma de Mexico, Mexico City (MX)

( * ) Notice: Subject to any disclaimer, the term of this patent is extended or adjusted under 35 U.S.C. 154(b) by 128 days.

(21) Appl. No.: 13/760,744

(22) Filed: Feb. 6, 2013

(65) Prior Publication Data
US 2013/0205942 A1    Aug. 15, 2013

(30) Foreign Application Priority Data

Feb. 7, 2012  (MX) .................... MX/a/2012/001596
Jan. 31, 2013 (MX) .................... MX/a/2013/001280

(51) Int. Cl.
*F16H 1/32*   (2006.01)
*F16F 15/14*  (2006.01)
*H02K 49/10*  (2006.01)

(52) U.S. Cl.
CPC ............. *F16F 15/14* (2013.01); *F16F 15/1478* (2013.01); *F16H 1/32* (2013.01); *H02K 49/102* (2013.01); *F16H 2001/325* (2013.01); *F16H 2001/328* (2013.01)
USPC ......................................... 475/165; 475/181

(58) Field of Classification Search
CPC ................ F16H 1/32; F16H 2001/328; F16H 2001/325; F16F 15/14; H02K 49/102
USPC .......... 475/162, 163, 165, 176, 177, 181, 183
See application file for complete search history.

(56) References Cited

U.S. PATENT DOCUMENTS

| | | | |
|---|---|---|---|
| 3,160,032 A * | 12/1964 | Black | 475/180 |
| 3,378,710 A | 4/1968 | Martin | |
| 4,520,693 A * | 6/1985 | Sfredda | 475/176 |
| 4,567,790 A * | 2/1986 | Butterfield et al. | 475/168 |

(Continued)

OTHER PUBLICATIONS

Rasmussen, P. et al., Development of a high performance magnetic gear, IEEE Transactions on Industry Applications, vol. 41, No. 3, 2005.

(Continued)

*Primary Examiner* — Justin Holmes
(74) *Attorney, Agent, or Firm* — Roylance, Abrams, Berdo & Goodman, L.L.P.

(57) ABSTRACT

The present invention refers to a conventional spur gear transmission or magnetic gear transmission, with a cycloidal configuration. The magnetic gears include contact points such that the mobile gear rolls on the fixed gear. Alternatively, a balance wheel is incorporated, which generates a centrifugal force opposite to the one associated with the mobile gear, of equal magnitude and on the same plane as this latter one, thereby completely eliminating the unbalancing of the mechanism. The balance wheel is mounted on the high-speed shaft in a manner similar to the mobile gear, and has the freedom to displace itself radially through centrifugal effect in the opposite direction to the eccentric position of the center of the mobile gear until it presses against a fixed track over which it rolls, concentric with the fixed gear with an equal force, opposite and collinear with that produced by the mobile gear.

4 Claims, 8 Drawing Sheets

(56) References Cited

U.S. PATENT DOCUMENTS

| | | |
|---|---|---|
| 4,808,869 A | 2/1989 | Kopp |
| 4,850,821 A | 7/1989 | Sakai |
| 5,013,949 A | 5/1991 | Mabe, Jr. |
| 5,569,111 A | 10/1996 | Cho et al. |
| 6,547,687 B2* | 4/2003 | Hagiike ........................ 475/181 |
| 2006/0040779 A1* | 2/2006 | Tsurumi et al. ............... 475/183 |
| 2011/0127869 A1 | 6/2011 | Atallah et al. |

OTHER PUBLICATIONS

Jorgensen, F. et al., The cycloidal permanent magnetic gear, IEEE Transactions on Industry Applications, vol. 44, No. 6, 2008.

* cited by examiner

CYCLOIDAL TRANSMISSIONS

FIELD OF INVENTION

The present invention refers to transmissions using magnetic gears and more specifically those having a cycloidal configuration, which function as speed reducers and amplifiers.

BACKGROUND OF THE INVENTION

In conventional cycloidal drives/transmissions generally used as speed reducers, a mobile gear with external teeth is propelled in a circular orbit by means of a crank of a high speed input shaft. Said mobile gear is meshed with a fixed annular gear with internal teeth. The crank radius is equal to the eccentricity between the two gears.

Typically, a coupling is used between the mobile gear and the low speed output shaft, capable of mechanically transmitting the rotational movement of said mobile gear, but not the orbital translation of the same. In said coupling the torque transmission is accomplished by means of a number of axial rods uniformly distributed on a disc integrated to the low speed shaft, which penetrate into an equal number of circular holes in the mobile gear.

Instead of using conventional spur gears in a cycloidal transmission, it is possible to use magnetic gears with magnets, such as is the case in the transmission described in Mexican patent application number MX/a/2012/001596 by the same applicant and titled Magnetic Cyclodial Transmission with Permanent Magnetic Gears for power transmission, and from which the present application claims priority. The use of magnetic gears is also described in other publications, such as U.S. Pat. Nos. 4,808,869, 4,850,821, 5,013,949 and 5,569,111. In some transmissions, permeable iron elements are used to guide a magnetic field of alternating direction resulting from the rotation of a central wheel with permanent magnets of alternating polarities causing a slow rotation of an exterior ring having a larger number of permanent magnets. Such is the case in the transmissions described in U.S. Pat. No. 3,378,710 and in U.S. Publication 2011/0127869 A1, and also in the transmission analyzed by P. O. Rasmussen et al in the article "Development of a high performance magnetic gear", IEEE Transactions on Industry Applications, vol. 41, no. 3, 2005. In the paper "The cycloidal permanent magnetic gear", IEEE Transactions on Industry Applications, vol.44, no. 6, 2008, by F. T. Jorgensen et al, a magnetic cycloidal transmission with a topology similar to that of the present invention is analyzed.

In the transmissions treated in all the previously mentioned references, the magnetic forces of attraction act across small gaps between the elements of the mechanism with no contact between them. In contrast with this characteristic, the magnetic gears of the present invention contact one another due to the fact that the mobile gear is free to move outwardly under the action of the magnetic attraction from the fixed gear and the centrifugal force, thus exerting pressure against the internal surface of said fixed gear as it rolls on it. In order for rolling to occur, the magnets of each gear must be assembled in such a way that they do not protrude from the contacting gear surfaces. In this way, the following advantages result: (1) the transmission's torque capacity is increased because, in addition to the magnetic force between the gears, a frictional force associated with the normal contact force, is developed; (2) the radial load on the bearing supporting the mobile gear is eliminated; (3) the need to accurately control the separation between the gears is eliminated and (4) the magnetic attraction forces between the gears are greater than would be if a gap were present.

In conventional cycloidal transmissions, a coupling is used between the mobile gear and the low speed shaft (the output shaft in the case of a speed reducer) that transmits only the rotational movement of that gear but filters out the circular translational movement resulting from its eccentric mounting. In such coupling, torque is transmitted by means of a number of axial pins uniformly distributed in a circular array in a disk integral with the low speed shaft, said pins penetrating in an equal number of circular holes in the orbiting gear, the radii of these holes being equal to the sum of the pin radii and the gear's axis eccentricity. In the present invention, roller bearings mounted on said pins are additionally incorporated to reduce the power loss due to friction between the pins and the surfaces of the holes of the orbiting gear. In this case, the outside radius of the bearings, instead of the pin radius, must be considered in calculating the radius of the holes. The incorporation of these bearings may not be feasible for large eccentricities.

One of the problems encountered in cycloidal transmissions, whether it be with spur gears or with magnetic gears, is the unbalance of the two gear system resulting in vibration due to the orbital movement of the mobile gear, given that its mass center is displaced in a circular trajectory which causes a centrifugal force of magnitude $m\omega^2 r$, where m represents the gear mass, $\omega$ the angular speed of the crank, and r the radius of the circular trajectory, said force represented by a vector which also rotates at a speed $\omega$. A way to lower this vibration, as for example, in one embodiment of the apparatus of U.S. Pat. No. 4,567,790, is by incorporating a second mobile gear propelled by a crank at 180° to the first. The vectors which represent the centrifugal forces of both gears are of the same magnitude but in opposite directions, however they are not collinear as they occur in different transverse planes, giving rise to a moment on a rotating plane, reason by which the vibration is not completely suppressed.

BRIEF DESCRIPTION OF THE INVENTION

Initially, a magnetic gear cycloidal transmission is disclosed, either for speed reduction or speed amplification, such that each gear has an even number of permanent magnets in its periphery, said magnets inserted in radial holes with alternating N and S exposed poles and without protruding from the corresponding gear surfaces, and such that the gears maintain contact with one another, the mobile gear rolling on the interior surface of the fixed gear.

Furthermore, it is disclosed that the mobile gear which is mounted on the high speed shaft, is free to move in a radially outward direction, ensuring its contact with the fixed gear's internal surface and allowing it to roll on said surface while its mass center moves in a circular trajectory imposed by the shaft on which it is eccentrically mounted. In this manner, the full force of the magnetic attraction between the two gears plus the centrifugal force due to the mobile gear's orbital motion are resisted by the contact pressure developed between said gears. This is possible because of the mobile gear's freedom to move radially and results in the following advantages: increased torque capacity due to a friction force in addition to a magnetic force between the gears and because the magnetic interaction forces increase due to the elimination of a gap between the gears; elimination of a radial load on the mobile gear's bearing; elimination of the need to accurately control a small gap between the gears.

It is also disclosed that the incorporation of a coupling between the mobile gear and the low speed shaft (the output shaft in the case of a speed reducer) transmits the gear's rotational movement but not its translational orbiting movement, the coupling consisting of a number of pins rigidly attached to a disk rigidly assembled to the low speed shaft, said pins penetrating in an equal number of holes in the mobile gear and each pin having a roller bearing providing a rolling contact with the inner surface of the holes which has a radius equal to the sum of the outer radius of the bearings and the mobile gear's eccentricity.

In order to provide an adequate path for the permanent magnets' field, both gears are made of a material with high magnetic permeability, except for the annular portion containing the magnets, which must be made of a non-magnetic material.

The present invention also describes a balance wheel, whose mass center moves in a circular trajectory on the same plane as the trajectory of the center of mass of the mobile gear, but at 180° of it, generating an equal centrifugal force, opposite and collinear to that of the mobile gear. Therefore, an objective of the present invention is providing a magnetic cycloidal gear transmission with permanent magnet gears, which have a magnetic gear equivalent to a gear with external teeth and another one equivalent to a gear with internal teeth, the first one being eccentrically mounted on a shaft, which in the case of a speed reducer corresponds to the input of power, and the second one being fixed. Furthermore, an element is incorporated which, in the case of a speed reducer, is driven by the first gear through a coupling that only transmits the rotation of said gear but not its translational movement resulting from its eccentric mounting. The input and output shafts in these transmissions are collinear.

Another objective of the present invention is to eliminate the unbalance due to the centrifugal force associated with the mobile gear of a cycloidal transmission by incorporating a balance wheel which shall generate a centrifugal force of the same magnitude and collinear but opposite in direction as the centrifugal force associated with the mobile gear, thereby completely eliminating the unbalance of the system.

BRIEF DESCRIPTION OF THE FIGURES

The particular characteristics and advantages of this invention, as well as other objectives of the invention, will become apparent from the following description, taken along with the attached figures, which are.

DETAILED DESCRIPTION OF THE INVENTION

First Embodiment—Cycloidal Magnetic Transmission with Permanent Magnet Gears

Figure 1:
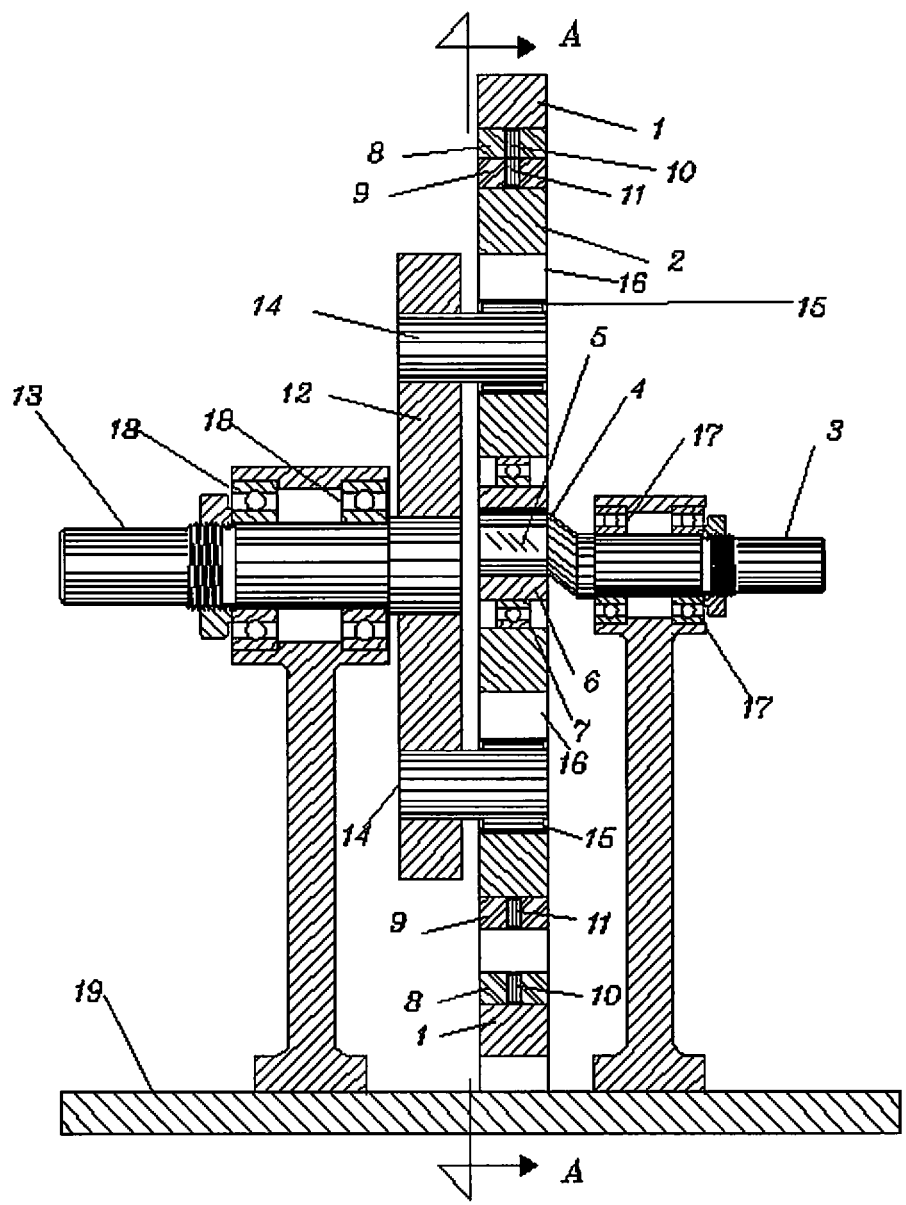
FIG. 1 is a view of the mid section of a first embodiment of the magnetic cycloidal transmission of the present invention.

FIG. 1 is a view of the mid section of the transmission showing the fixed magnetic gear 1, the mobile magnetic gear 2, the high speed shaft 3, having a throw at its end, forming a crank 4 with two flat parallel surfaces 5, that allow the central piece 6 on which gear 2 is mounted by means of bearing 7, to slide freely in the radial direction. Gear 1 has an internal ring of non-magnetic material 8 and gear 2 an external ring of non-magnetic material 9. Inserted permanently in ring 8 are an even number of permanent magnets 10, and a smaller even number of permanent magnets 11 in ring 9. With the exception of rings 8 and 9, gears 1 and 2 are made of a high magnetic permeability material. Disk 12 is rigidly attached to the low speed shaft 13 and has rigidly attached to it a plurality of axial pins 14, each having a roller bearing 15. Each bearing 15 makes rolling contact with the surface of a hole 16 in gear 2. The number of holes 16 is equal to the number of pins 14. The radius of the holes 16 is equal to the sum of the outside radius of the bearings 15 and the eccentricity of the mobile gear 2. The high-speed shaft 3 is supported by member 48 and mounted on bearings 17 having a retaining nut 46. The low speed shaft is supported by member 49 and mounted on bearings 18 having a retaining nut 47. Support members 48 and 49 are attached to base plate 50.

Figure 2:
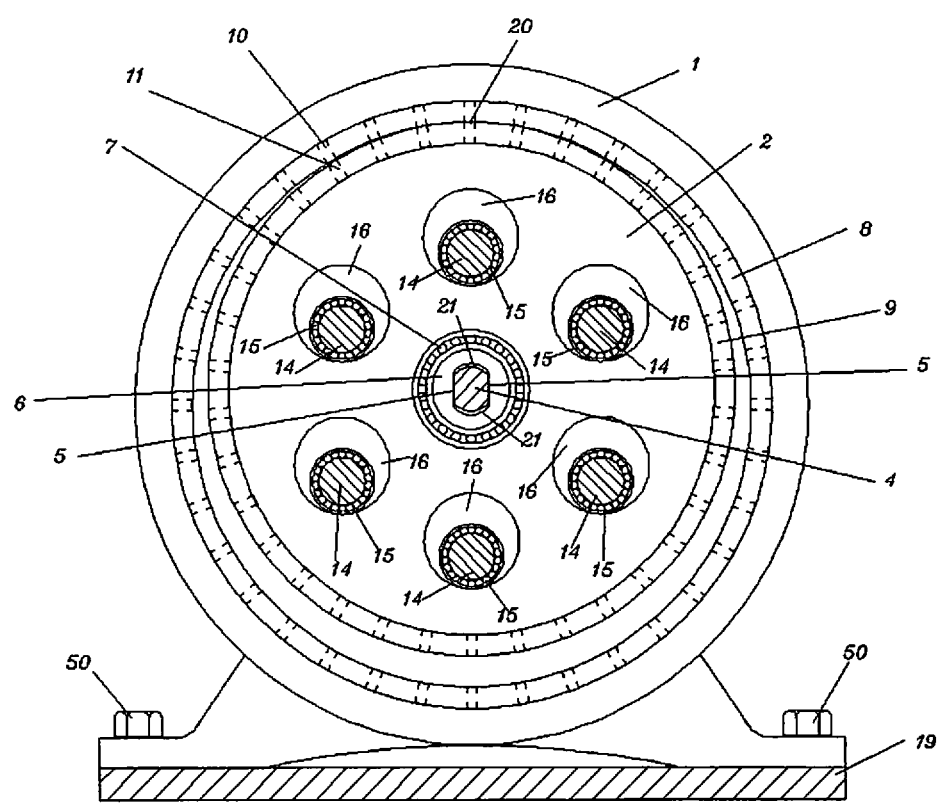
FIG. 2 is a front view of the transmission according to section A-A in FIG. 1.

FIG. 2 is a front view of the transmission according to section A-A in FIG. 1, which shows magnetic gears 1 and 2, their respective rings of non magnetic material 8 and 9 and crank 4 in section allowing a view of its flat sides 5. Also shown in FIG. 2 are the central piece 6, the bearing 7 and the permanent magnets 10 of gear 1 and 11 of gear 2. Also shown in FIG. 2 are pins 14, bearings 15, holes 16 in gear 2, and a base plate 19 for the transmission.

The magnetic gear cycloidal transmission is kinematically equivalent to a conventional gear cycloidal transmission. Gear 1 is equivalent to a gear with internal teeth, and gear 2 to a gear with external teeth. Such as was described in patent application number MX/2012/001596 filed in Mexico, corresponding to the same applicant and the priority of the present patent application, the force transmission between the magnetic gears is effected by the attraction in the tangential direction between magnets of opposite polarities, arising from a slight relative displacement, and also, by friction associated to a normal contact force between the gears.

In the view of the mid-section of the transmission, FIG. 1, the fixed magnetic gear 1 and the mobile magnetic gear 2 are shown. The internal periphery of gear 1 and the external periphery of gear 2, consist of non-magnetic rings 8 and 9 respectively. FIG. 2 shows the contact point 20 between gears 1 and 2. This contact point moves along the internal circumference of gear 1 making one complete turn in each revolution of the high speed shaft 3 and consequently also of the center of gear 2 which is mounted on crank 4. At the contact point between the gears, a normal force results from the attraction between magnets 10 of gear 1 and 11 of gear 2 and also from the centrifugal force due to the circular motion of the center of mass of gear 2. This action takes place because gear 2 is free to move in a radially outward direction in view of the slidable cooperation between center piece 6 and the throw of crank 4. Clearance gaps 21, shown in FIG. 2, ensure that no radial force is transmitted to bearing 7 and that the magnetic attraction exerted on mobile gear 2 by fixed gear 1 as well as the centrifugal force on mobile gear 2, are resisted solely by pressure generated at the contact point between the two gears. The contact between gears helps the transmission of power with friction, and also with a greater force between the magnets than if there was no contact, as in the prior art, since said force decreases rapidly with the gap size between the magnets. The exposed poles of the permanent magnets alternate from N to S along the periphery of each gear. As in a conventional mechanical cycloidal gear transmission, the speed ratio between shafts 3 and 13 is $n_2/(n_1-n_2)$ where $n_1$ and $n_2$ represent the number of magnet pairs in gears 1 and 2 respectively. Gear 2 has a movement characterized by a circular translational speed of the same magnitude and sense as the angular speed $\omega_3$ of shaft 3, and a rotational speed of opposite sense of magnitude $$\frac{(n_1 - n_2)}{n_2} \omega_3,$$

the same as that of shaft 13. As may be appreciated, the motion of gear 2 relative to disk 12 is a circular translation of magnitude $\omega_3$. Thus, each pin 14 executes one revolution inside a hole 16 of gear 2 for each revolution of shaft 3.

Power flows from shaft 3 to shaft 13 in the speed reducer mode of the transmission, and from shaft 13 to shaft 3 in the speed amplifier mode.

Figure 3:
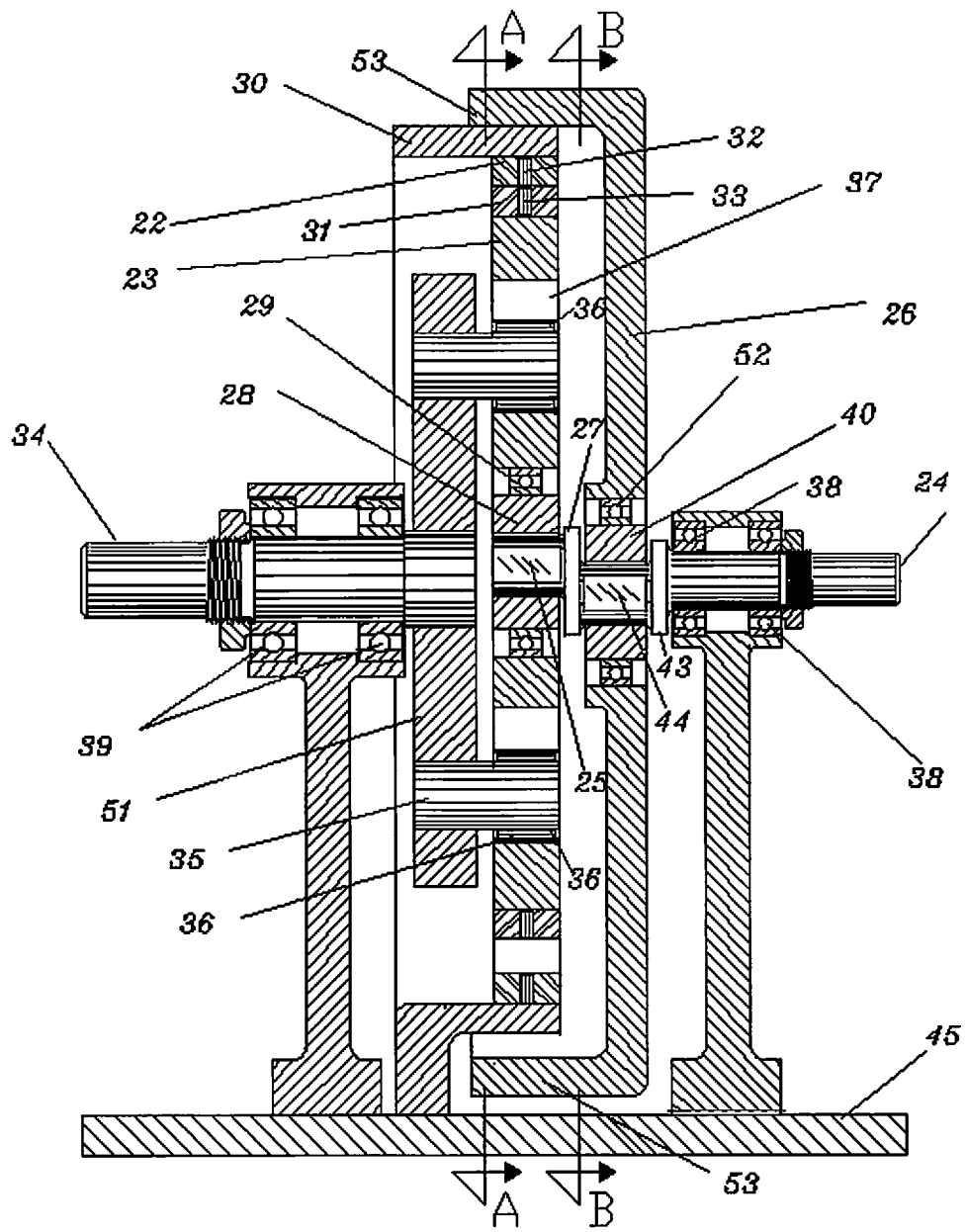
FIG. 3 is a mid-section view of a second embodiment of a cycloidal magnetic gear transmission incorporating a balance wheel.

Second Embodiment—Cycloidal Magnetic Transmission with Permanent Magnet Gears and a Balance Wheel FIG. 3 is a view of the mid section of the transmission showing the fixed magnetic gear 30, the mobile magnetic gear 23, the high speed shaft 24, having a throw at its end, forming a crank 27 with two flat parallel surfaces 25, that allow the central piece 28 on which gear 23 is mounted by means of bearing 29, to slide freely in the radial direction. Gear 30 has an internal ring of non-magnetic material 22 and gear 23 an external ring of non-magnetic material 31. Inserted permanently in ring 22 are an even number of permanent magnets 32, and a smaller even number of permanent magnets 33 in ring 31. With the exception of rings 22 and 31, gears 30 and 23 are made of a high magnetic permeability material. Disk 51 is rigidly attached to the low speed shaft 34 and has rigidly attached to it a plurality of axial pins 35, each having a roller bearing 36. Each bearing 36 makes rolling contact with the surface of a hole 37 in gear 23. The number of holes 37 is equal to the number of pins 35. The radius of the holes 37 is equal to the sum of the outside radius of the bearings 36 and the eccentricity of the mobile gear 23. The high-speed shaft 24 is mounted on bearings 38, and the low speed shaft 34 on bearings 39. A base plate 45 for the transmission is shown in FIGS. 3 and 4.

In this embodiment, a balance wheel 26 is used to eliminate the unbalance caused by the orbital movement of the mobile gear 23 resulting from the rotation of high speed shaft 24 which has a crank throw 27 on which the central piece 28 is mounted and which transmits motion to gear 23 through bearing 29. The center of the balance wheel is displaced in a circular trajectory, and is propelled by crank throw 43 of the high speed shaft 24 unto which said balance wheel is mounted by means of bearing 52 and central piece 40. In FIG. 4 is shown the contact point 41 between gears 23 and 30. The crank 43 of the balance wheel and the crank 27 of the mobile gear are parts of the high speed shaft 24 and are diametrically opposed, that is, at 180° from each other.

The mobile gear 23 is free to move in a radially outward direction in view of the slidable cooperation between center piece 28 and crank throw 27. Clearance gaps 55, shown in FIG. 4, ensure that no radial force is transmitted to bearing 29.

Figure 4:
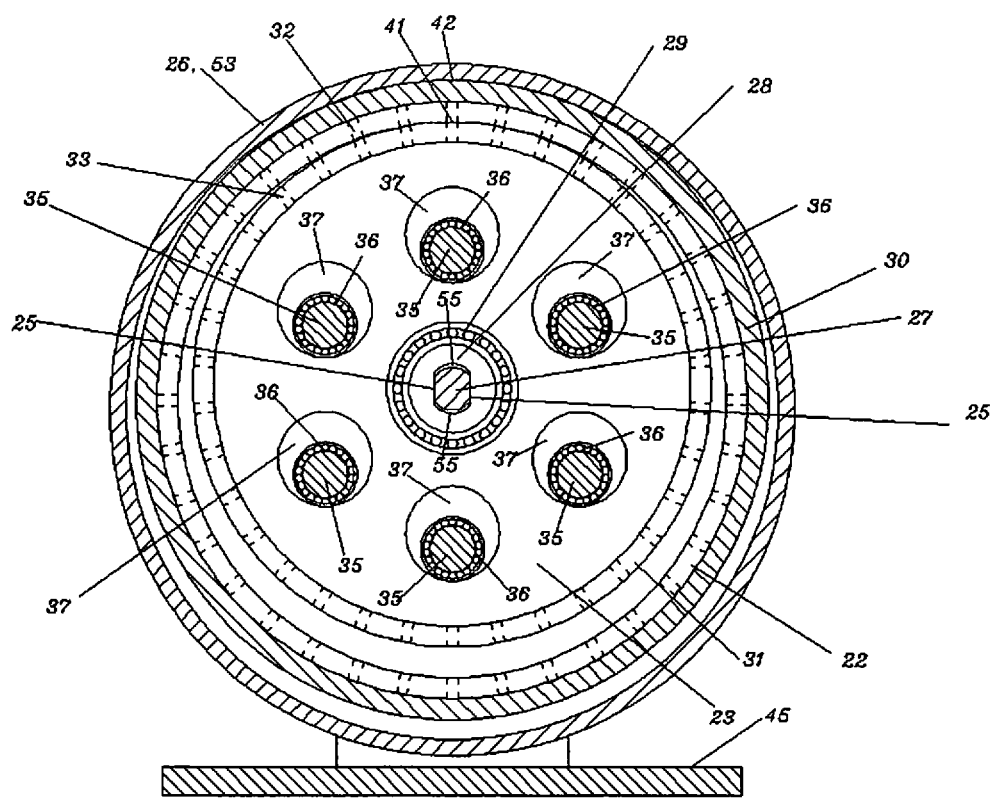
FIG. 4 is a front view of the cycloidal magnetic gear transmission according to section of lines A-A of FIG. 3.
Figure 5:
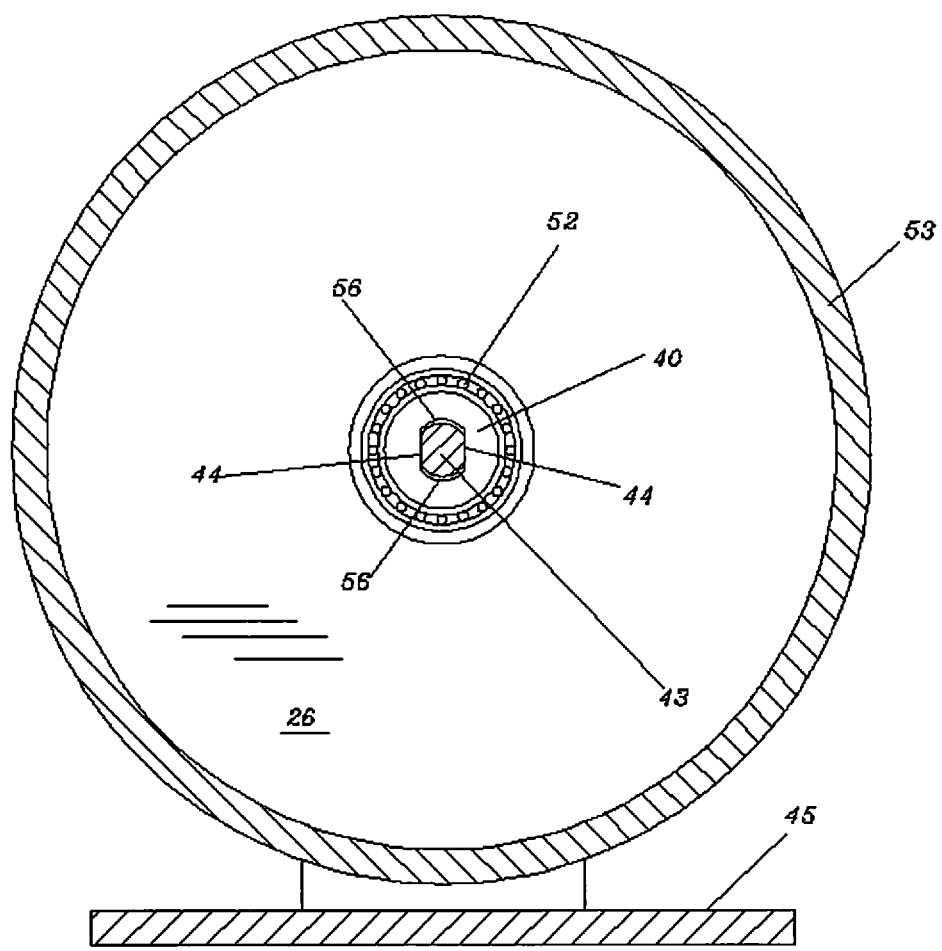
FIG. 5 is a front view of the cycloidal magnetic gear transmission according to the section of lines B-B of FIG. 3.

The balance wheel 26 has an extension 53 which has a ring shape, wherein an inner surface of the extension comes into contact, shown as point 42 in FIG. 4, with a cylindrical track made up by the outer surface of the fixed gear 30. This contact between the inner surface of the extension and the outer surface of the fixed gear generates a reaction due to the centrifugal force on the balance wheel, given that the assembly of the balance wheel at the crank does not restrict its radial displacement because, as shown in FIG. 5, the crank throw 43 cooperates slidably in the radial direction with central piece 40 on account of the flat parallel mating surfaces 44 in 43 and 40, and in view of clearance gaps 56. In this way, the balance wheel rolls on the cylindrical track of the outer surface of the fixed gear.

The centrifugal force on the balance wheel is opposite to the centrifugal force associated with the mobile gear. Said centrifugal opposing forces are preferably collinear and of equal magnitude, which is possible by requiring that the trajectories of the centers of mass of the mobile gear 23 and balance wheel 26 lie in the same plane and that the mass, $m_b$, of the balance wheel, the mass, $m_e$, of the mobile wheel, the eccentricity, $e_b$, of the balance wheel and the eccentricity, $e_e$, of the mobile wheel satisfy the relationship $m_b\,e_b = m_e\,e_e$.

This method of balancing does not introduce any additional loads on the bearings of the transmission.

Figure 6:
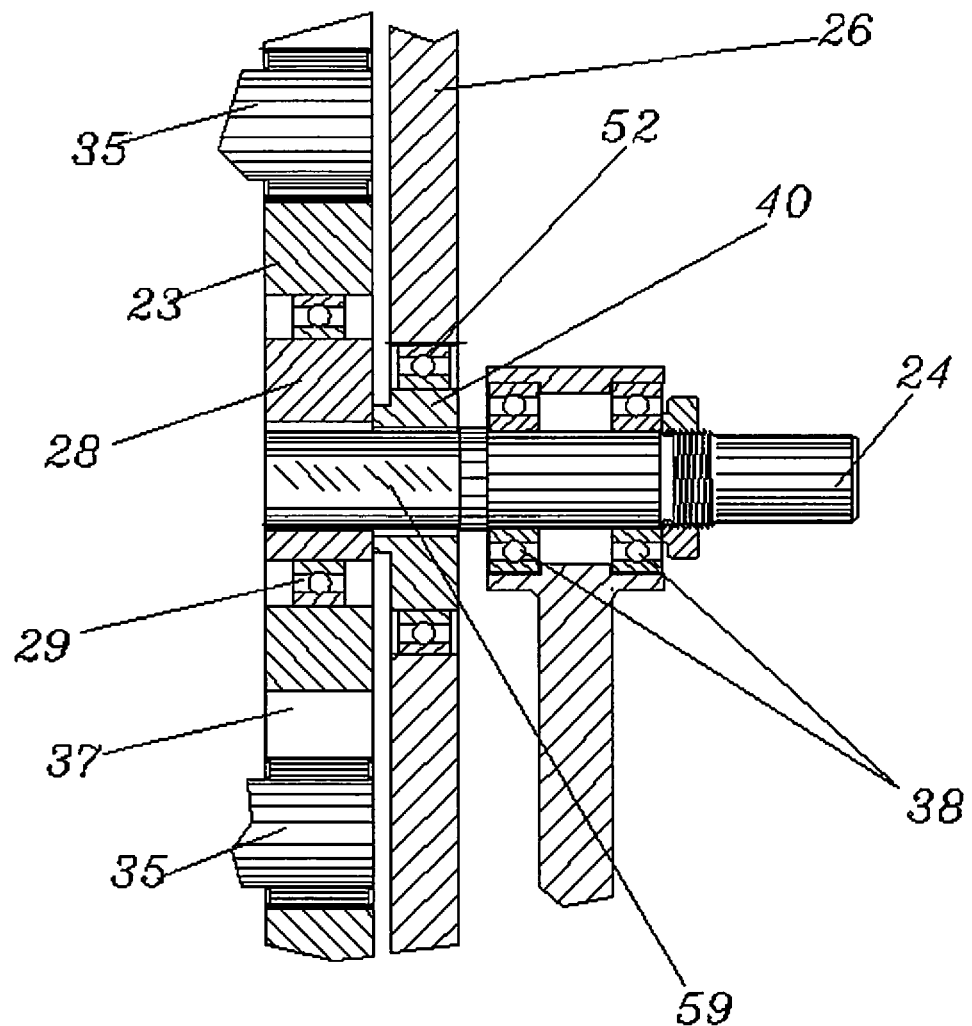
FIG. 6 is a fragmentary view of the mid-section of the cyclodial magnetic gear transmission according to the second embodiment showing a modified high speed shaft.
Figure 7:
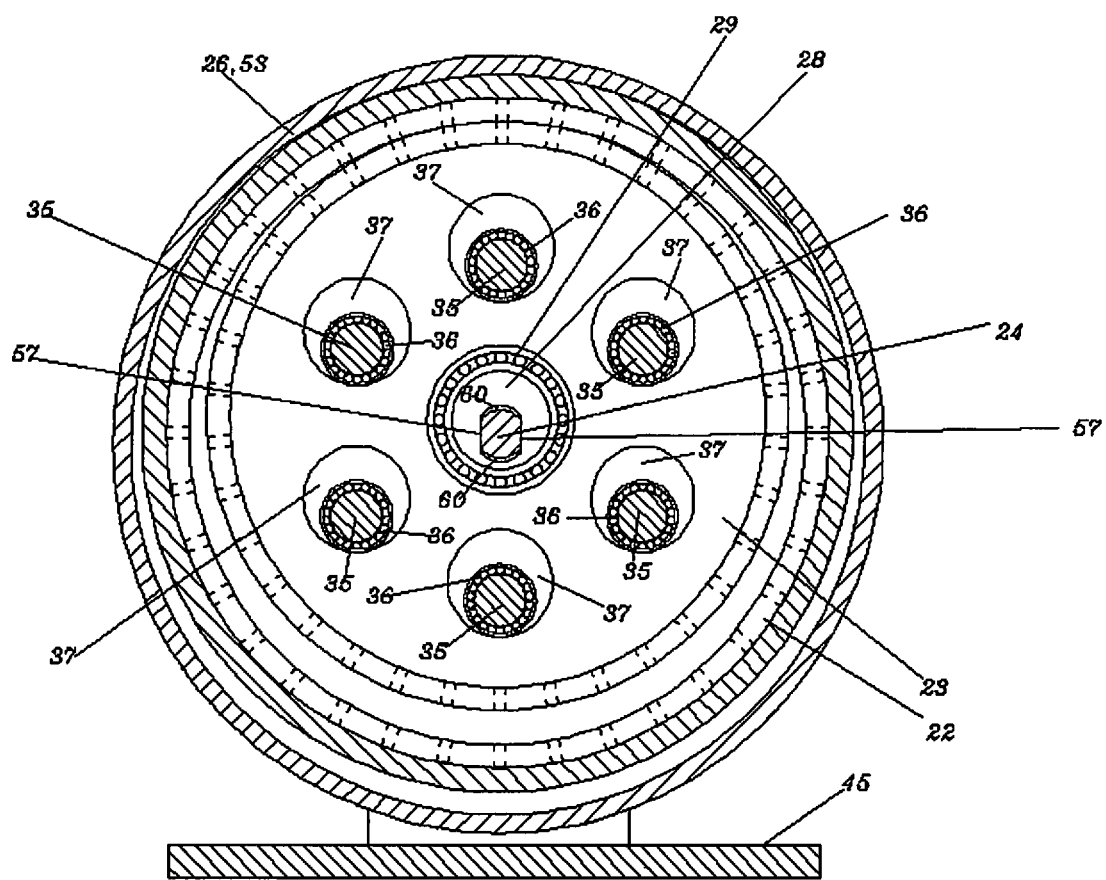
FIG. 7 is a front view of the cyclodial magnetic gear transmission according to section A-A of FIG. 3, showing a modified high speed shaft.
Figure 8:
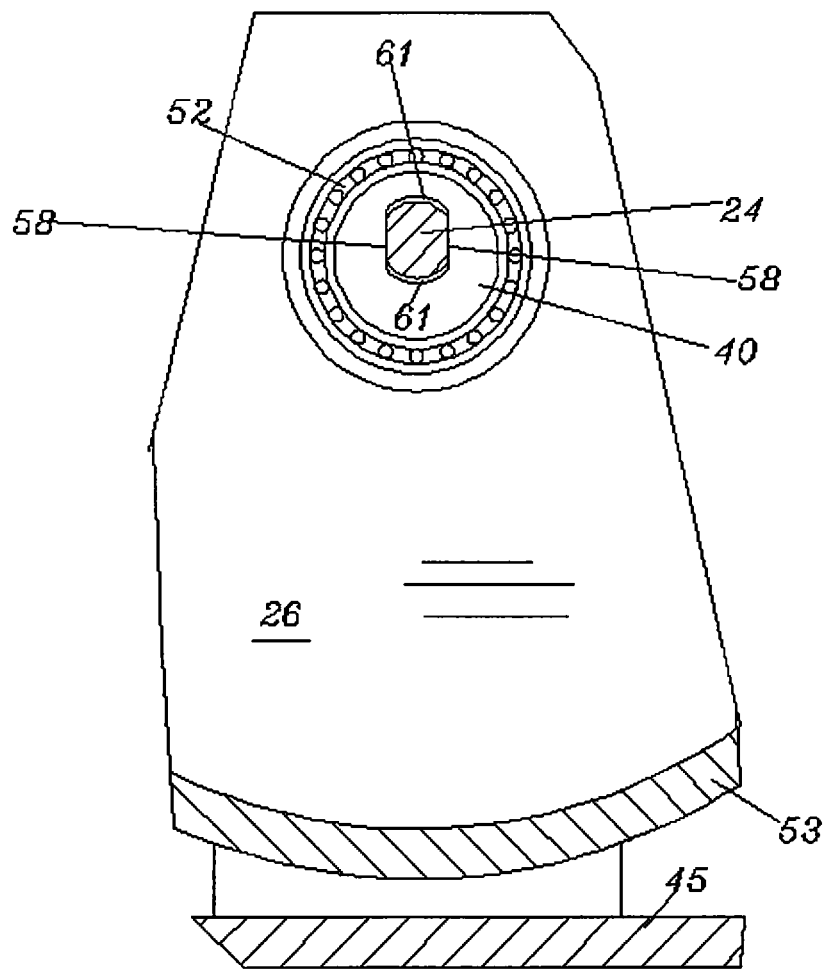
FIG. 8 is a fragmentary front view of the cyclodial magnetic gear transmission with a modified shaft according to section B-B of FIG. 3.

In FIGS. 6, 7 and 8 is shown a modification of the cycloidal magnetic transmission depicted in FIGS. 3, 4, and 5, applicable in the case of a high speed ratio, corresponding to a mobile gear with a diameter exceeding about 90% of the diameter of the fixed gear.

Given this, it is possible to obtain the eccentric movement of the mobile gear 23 and of the balance wheel 26 without having to resort to crankshaft throws on the high speed shaft 24, but rather by means of eccentric buttonholes in the respective central pieces 28 and 40, as can be seen in FIGS. 6, 7 and 8. The buttonhole in central piece 28 has parallel flat sides 57 and clearance gaps 60 to provide unrestricted slidable cooperation with the high speed shaft 24. Also, as shown in FIG. 8, the buttonhole in central piece 40, has parallel flat sides 58 and clearance gaps 61 to provide unrestricted slidable cooperation with the high speed shaft 24.

In so far as this invention has been described, there are alterations, permutations and the like which fall within this invention's reach. It should also be noted, that there are many alternatives to implement the apparatus and methods of the present invention. Therefore, it is intended that the following claims be interpreted including all the alterations, permutations and the like which fall within the true spirit and reach of the present invention.

The invention claimed is:

1. A magnetic gear cycloidal transmission for high ratio speed reduction or amplification comprising:

a fixed magnetic gear consisting of an outer ring of high magnetic permeability material and a concentrically secured inner ring of non magnetic material having a cylindrical inner surface and having an even number of uniformly spaced radial holes, each hole fixedly containing a permanent magnet with its axis in radial alignment, the magnet poles nearer the inner surface alternate in polarity around the periphery and are as near as practically possible to said inner surface without protruding therefrom;

a mobile magnetic gear consisting of a disk of high permeability material with a concentrically secured outer ring of non magnetic material having a cylindrical outer surface and having a smaller even number of uniformly spaced radial holes, each hole fixedly containing a permanent magnet with its axis in radial alignment, the magnet poles nearer the outer surface alternate in polarity around the periphery and are as near as practically possible to the outer surface of said outer ring without protruding therefrom, said mobile gear rotatably supported on a central piece by means of a bearing, said central piece having a central hole of substantially rectangular or buttonhole shape engaged by a crank throw of a high speed shaft, said crank throw having two parallel flat sides oriented as the throw itself, that maintain contact with two opposite sides of the hole of the central piece, providing a sliding cooperation with said central piece in the radial direction within a range allowed by clearance gaps on the ends of the rectangular hole, the range being sufficient to ensure contact between the outer surface of the mobile gear and the inner surface of the fixed gear as the mobile gear is propelled in a circular trajectory by the crank throw causing said mobile gear to roll on the inner surface of the fixed gear while the magnetic attraction between the two gears and the centrifugal force on the mobile gear are resisted by the force developed at the contact between said gears; and a suitable mechanism to transfer to a low speed shaft in coaxial alignment with the high speed shaft, the slow rotation of the mobile gear, filtering out its fast circular translation.

2. The transmission of claim 1 incorporating a mechanism to transfer to a low speed shaft in coaxial alignment with the high speed shaft, the slow rotation of the mobile gear, filtering out its fast circular translation, consisting said mechanism of a disk, fixed to the low speed shaft, with a plurality of axial pins which are inserted in an equal number of circular holes of the mobile gear, there being a roller bearing assembled to each pin with an outer race that rolls on the interior surface of a hole, said hole having a radius equal to the sum of the outside radius of the bearing and the eccentricity of the mobile gear.

3. The transmission of claim 1 incorporating a balancing system that does not introduce radial loads on any bearings, consisting of a balance wheel rotatably supported on a central piece by means of a bearing, said central piece having a central hole of substantially rectangular or buttonhole shape engaged by a second crank throw of a high speed shaft, at 180° from the throw which propels the center of the mobile gear, said second crank throw having two parallel flat sides oriented as the throw itself, that maintain contact with two opposite sides of the hole of the central piece, providing a sliding cooperation with said central piece in the radial direction within a range allowed by clearance gaps on the ends of the rectangular hole, the range being sufficient to allow an annular extension of the balance wheel to pressure through centrifugal action, on an inner surface of said annular extension against a fixed cylindrical concentric track of the fixed gear wherein the mass of the balance wheel, $m_b$, the mass of the mobile gear, $m_e$, the eccentricity of the balance wheel, $e_b$, and the eccentricity of the mobile gear, $e_e$, satisfy the relationship $m_b e_b = m_e e_e$, and the trajectories of the centers of mass of the balance wheel and of the mobile gear lie in the same transverse plane.

4. The transmission of claim 3 modified for the case of a high speed ratio wherein the buttonhole in the central piece of the mobile gear is shifted along its length a distance equal to the required eccentricity of said mobile gear, and the buttonhole in the central piece of the balance wheel is shifted along its length in the opposite direction a distance equal to the required eccentricity of said balance wheel, and the high speed crankshaft is substituted by a straight high speed shaft with a portion of its length having two parallel flat sides enabling said portion to penetrate the central pieces of both the mobile gear and the balance wheel resulting in a sliding cooperation with both, allowing the mobile gear to exert pressure on the fixed gear and the annular extension of the balance wheel to exert pressure on the fixed cylindrical track of the fixed gear.

* * * * *